United States Patent
Peter et al.

(10) Patent No.: US 9,044,798 B2
(45) Date of Patent: Jun. 2, 2015

(54) WIRED CONDUIT SEGMENT AND METHOD OF MAKING SAME

(75) Inventors: Andreas Peter, Niedersachsen (DE); John Macpherson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 1045 days.

(21) Appl. No.: 12/841,254

(22) Filed: Jul. 22, 2010

(65) Prior Publication Data

US 2011/0017334 A1 Jan. 27, 2011

Related U.S. Application Data (60) Provisional application No. 61/227,909, filed on Jul. 23, 2009.

(51) Int. Cl.
| | | |
|---|---|---|
| *B21C 23/08* | (2006.01) | |
| *B21C 23/14* | (2006.01) | |
| *E21B 17/00* | (2006.01) | |
| *F16L 39/00* | (2006.01) | |
| *F16L 47/16* | (2006.01) | |

(52) U.S. Cl.
CPC .............. *B21C 23/085* (2013.01); *B21C 23/14* (2013.01); *E21B 17/003* (2013.01); *F16L 39/00* (2013.01); *F16L 47/16* (2013.01)

(58) Field of Classification Search
CPC ...................................... F16L 9/18; F16L 7/00
USPC .......................................... 138/108; 175/320
See application file for complete search history.

(56) References Cited

U.S. PATENT DOCUMENTS

| | | | | |
|---|---|---|---|---|
| 2,005,699 | A * | 6/1935 | Gottwald | 285/61 |
| 4,476,923 | A | 10/1984 | Walling | |
| 4,924,949 | A * | 5/1990 | Curlett | 175/25 |
| 6,026,897 | A | 2/2000 | Pringle et al. | |
| 6,192,941 | B1 * | 2/2001 | Mallen-Herrero et al. | 138/135 |
| 6,354,146 | B1 | 3/2002 | Birchak et al. | |
| 6,507,686 | B1 * | 1/2003 | Heinz et al. | 385/100 |
| 6,572,306 | B2 * | 6/2003 | Prusak | 405/183.5 |
| 6,641,434 | B2 * | 11/2003 | Boyle et al. | 439/577 |
| 6,830,467 | B2 * | 12/2004 | Hall et al. | 439/194 |
| 6,923,273 | B2 * | 8/2005 | Terry et al. | 175/45 |
| 6,926,098 | B2 * | 8/2005 | Peter | 175/40 |
| 6,975,243 | B2 * | 12/2005 | Clark et al. | 340/854.6 |
| 6,981,546 | B2 | 1/2006 | Hall et al. | |
| 7,114,401 | B2 * | 10/2006 | Peter | 73/861.63 |

(Continued)

OTHER PUBLICATIONS

Alcoa Oil & Gas; "Drill Pipe Engineering Data—Version 1.0".

(Continued)

*Primary Examiner* — Paul R Durand
*Assistant Examiner* — Vishal Pancholi
(74) *Attorney, Agent, or Firm* — Cantor Colburn LLP (57) ABSTRACT

A method of manufacturing a downhole conduit segment is disclosed. The method includes: extruding a material as a tubular shape to form a body of the conduit segment having an interior bore extending through a length of the segment, the body including an exterior surface and an interior surface defined by the interior bore, the material being an extrudable material sufficient to withstand conditions in a downhole environment; and extruding at least one passageway extending along the length of the body and disposed at least partially between the exterior surface and the interior surface, the at least one passageway having a shape configured to restrict lateral movement of a conductor disposed therein.

9 Claims, 6 Drawing Sheets

(56) References Cited

U.S. PATENT DOCUMENTS

| | | |
|---|---|---|
| 7,413,021 B2 | 8/2008 | Madhavan et al. |
| 7,819,206 B2 * | 10/2010 | Peter ............................. 175/50 |
| 2002/0007970 A1 | 1/2002 | Terry et al. |
| 2004/0244964 A1 * | 12/2004 | Hall et al. .................... 166/65.1 |
| 2005/0001736 A1 * | 1/2005 | Hall et al. .................. 340/854.1 |
| 2005/0046590 A1 * | 3/2005 | Hall et al. .................. 340/854.8 |
| 2006/0225926 A1 * | 10/2006 | Madhavan et al. ............ 175/320 |
| 2006/0289074 A1 * | 12/2006 | Eriksson et al. .............. 138/171 |
| 2007/0159351 A1 * | 7/2007 | Madhavan et al. ......... 340/855.1 |
| 2011/0018262 A1 * | 1/2011 | Peter ............................. 285/333 |
| 2011/0044697 A1 * | 2/2011 | Peter et al. .................... 398/140 |
| 2011/0108267 A1 * | 5/2011 | Chaize et al. .............. 166/242.6 |

OTHER PUBLICATIONS

Notification of Transmittal of the International Search Report and the Written Opinion of the International Searching Authority, or the Declaration; PCT/US2010/042918; Feb. 17, 2011.

* cited by examiner

WIRED CONDUIT SEGMENT AND METHOD OF MAKING SAME

CROSS-REFERENCE TO RELATED APPLICATIONS AND PRIORITY CLAIM

This application claims the benefit of U.S. Provisional Application Ser. No. 61/227,909, entitled "WIRED CONDUIT SEGMENT AND METHOD OF MAKING SAME", filed Jul. 23, 2009, under 35 U.S.C. §119(e), which is incorporated herein by reference in its entirety.

BACKGROUND

In subterranean drilling and completion applications, a pipe or other conduit, referred to as a "string", is lowered into a wellbore, i.e., a borehole, in an earth formation during or after drilling operations. In some applications, such as drilling, the string is lowered into a borehole by connecting numerous pipe segments. Various power and/or communication signals may be transmitted through the pipe segments via a "wired pipe" configuration. Such configurations include electrical, optical or other conductors extending along the length of selected pipe segments. The conductors are operably connected between pipe segments by a variety of coupling configurations.

Generally, in wired pipe configurations, one or more conductors such as wires or cables are run along the inside diameter of a typically steel pipe segment. The conductors are generally protected from drilling or production fluid and other objects (such as cementing darts) that are pumped downhole or flowing through the pipe segments. Mechanisms to protect the conductors include small diameter protective steel tubings. Although such tubings may serve to protect the conductors, they represent a potential obstacle to efficient fluid flow and components such as wireline measurement tools and cementing equipment that are disposed in the pipe segments.

BRIEF DESCRIPTION

Disclosed herein is a method of manufacturing a downhole conduit segment including: extruding a material as a tubular shape to form a body of the conduit segment having an interior bore extending through a length of the segment, the body including an exterior surface and an interior surface defined by the interior bore, the material being an extrudable material sufficient to withstand conditions in a downhole environment; and extruding at least one passageway extending along the length of the body and disposed at least partially between the exterior surface and the interior surface, the at least one passageway having a shape configured to restrict lateral movement of a conductor disposed therein.

Also disclosed herein is a downhole conduit segment including: a tubular body having an interior bore extending through a length of the segment, the body including an exterior surface and an interior surface defined by the interior bore, the body made from an extrudable material sufficient to withstand conditions in a downhole environment; and at least one extruded passageway extending along the length of the body and disposed at least partially between the exterior surface and the interior surface, the at least one passageway having a shape configured to restrict lateral movement of a conductor disposed therein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
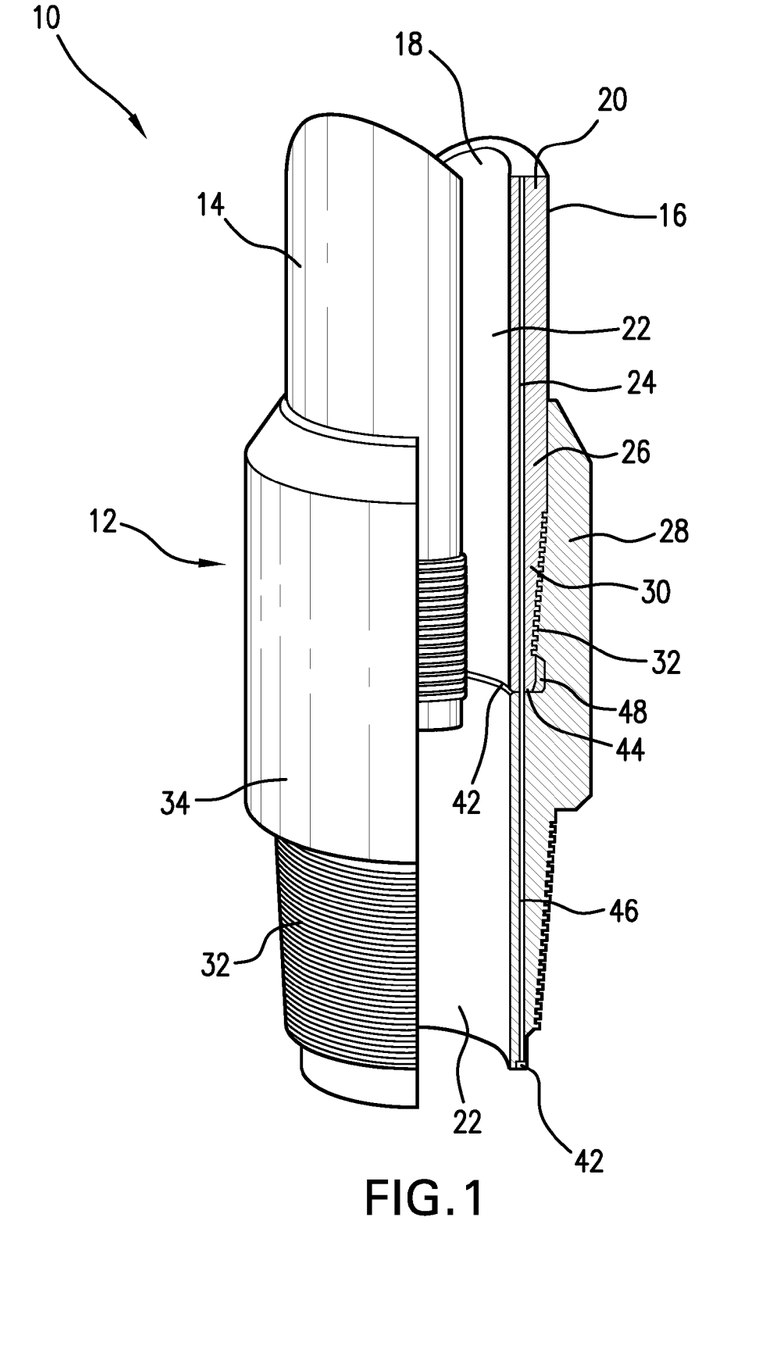
FIG. 1 depicts exemplary embodiments of a portion of a well drilling, production and/or logging system including a plurality of borehole string components.

Referring to FIG. 1, an exemplary embodiment of a portion of a well drilling, production and/or logging system 10 includes a conduit or string 12, such as a drillstring or production string. The string 12 is configured to be disposed in a borehole for performing operations such as drilling the borehole, making measurements of properties of the borehole and/or the surrounding formation downhole, and facilitating hydrocarbon production.

The string 12 includes at least one string or pipe segment 14. The pipe segment 14 is an elongated pipe or other tubular body, and includes an outer surface 16 and an inner surface 18 forming a segment wall 20. An inner bore (e.g., mud bore) or other segment conduit 22 extends along the length of each segment 14 to allow drilling mud or other fluids to flow therethrough. At least one communications conduit 24 extends along the length of the segment 14, and is disposed in the segment wall 20 between the inner surface 16 and the outer surface 18. The pipe segment 14 is made from materials suitable for downhole operation, such as steel. In one embodiment, the pipe segment 14 is made from an extrudable material that is capable of withstanding conditions in a downhole environment. Examples of such materials include extrudable metallic materials such as steel, aluminum and aluminum alloys.

In one embodiment, the segment 14 includes one or more couplers 26, 28 disposed at an end of the segment 14, to enable the segment 14 to be coupled with other segments 14 or other components.

In one embodiment the coupler 26 includes a male coupling portion 30 having an exterior threaded section, and is referred to herein as a "pin" 26. The coupler 28 includes a female coupling portion 32 having an interior threaded section, and is referred to herein as a "box" 28. The pin 26 and the box 28 are configured so that the pin 26 can be disposed within the box 28 to affect a fixed connection therebetween to connect the segment 14 with an adjacent segment 14 or other component. In one embodiment, the exterior of the male coupling portion 30 and the interior of the female coupling portion 32 are tapered along the length of the segment 14 to facilitate coupling. Although the pin 26 and the box 28 are described has having threaded portions, the pin 26 and the box 28 may be configured to be coupled using any suitable mechanism, such as bolts or screws and an interference fit or combinations thereof.

In one embodiment, the string 12 includes a tool joint 34 configured to connect pipe segments 14 in the string 12. In one embodiment, the tool joint 34 includes connectors at each end such as a pin 26 and a box 28. In this embodiment, the tool joint 34 includes a box 28 configured to engage the pin 26 of the segment 14. The tool joint 34 also includes a pin 26 configured to engage a box 28 of another segment 14. In one embodiment, the tool joint 34 is configured to be shrink-fitted to the segment 14.

The connection configurations described herein are exemplary and non-limiting. In addition to or in place of a threaded pin and box connection, any suitable connection may be used. For example, the segments 14 are connected via a mechanical connection such as a press fit connection.

The communications conduit 24 is located within the segment 14 to provide protection for electrical, optical or other conductors to be disposed along the segment 14. The communications conduit 24 includes at least one passageway that extends through the entire length of the segment 14, or through a portion thereof. The communications conduit 24 is configured to receive a conductor or other elongated body, such as a protective sheath, and guide the conductor through the segment wall 20.

In one embodiment, the communications conduit 24 is configured to secure the conductor(s) and/or other elongated body therein, such as by mechanical action. The communications conduit 24 is disposed within the wall 20, between the outer surface 16 and the inner surface 18 of the segment 14. In one embodiment, the communications conduit 24 has a cross-sectional or lateral shape that is configured to restrict lateral movement of a conductor, conductor sheath, or other elongated body disposed therein. In one embodiment, the cross-sectional or lateral shape is a shape that can be made by extrusion.

Figure 2:
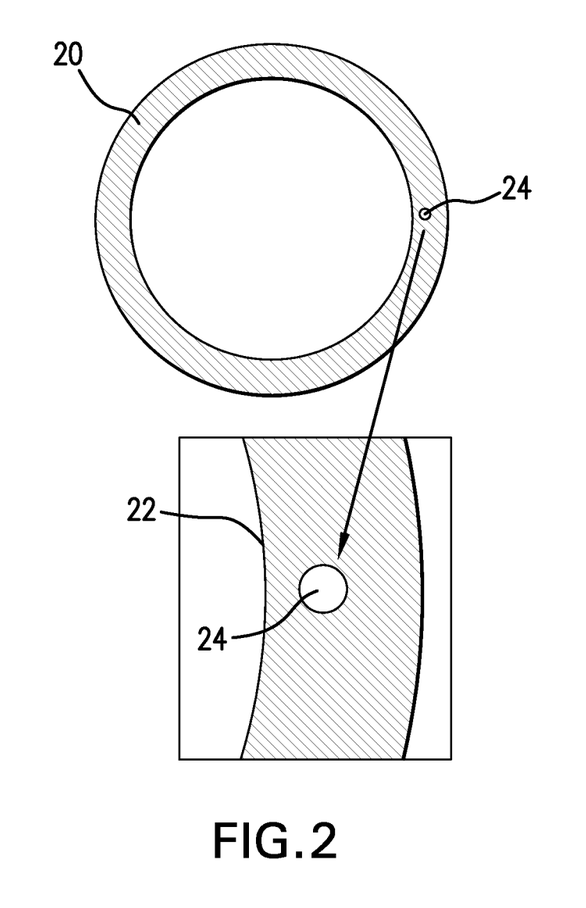
FIG. 2 is a cross-section of an exemplary embodiment of a borehole string component of FIG. 1.

Referring to FIG. 2, in one embodiment, the communications conduit 24 is a hole or passageway 35 that is completely surrounded by the wall material. This passageway 35, due to its configuration, completely isolates the conductor that can be run or fed therethrough from exposure to the interior of the inner bore 22. The passageway 35 may be extruded during manufacture of the pipe segment 14 or drilled through the segment wall 20, for example.

Figure 3:
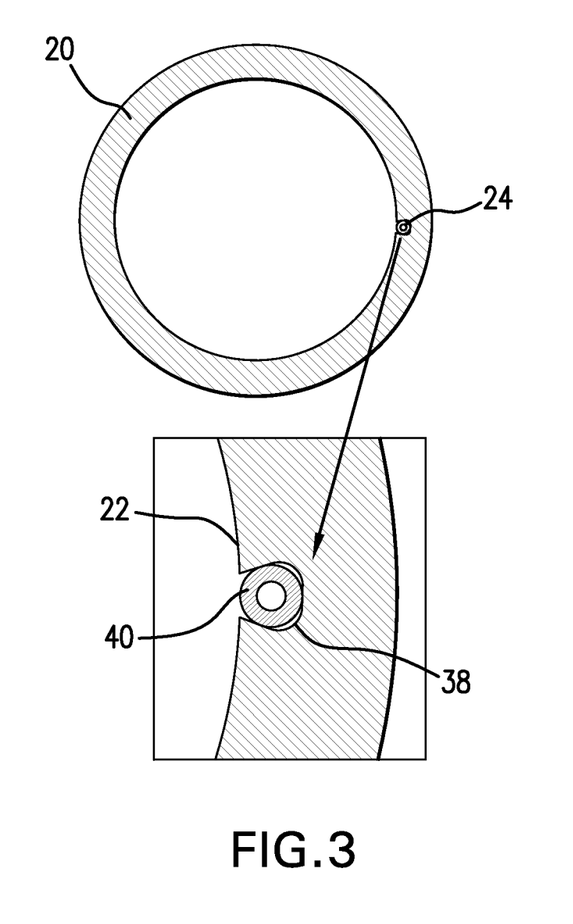
FIG. 3 is a cross-section of another exemplary embodiment of a borehole string component of FIG. 1.

Referring to FIG. 3, in one embodiment, the communications conduit 24 is an elongated indentation, groove or channel 38 extending along the inner surface 18 of the segment 14. The channel 38 may be ground, machined, etched or extruded into the inner surface 18 or otherwise formed therein.

In one embodiment, the channel 38 has a lateral or cross-sectional shape that is configured to secure one or more conductor(s) or other elongated bodies within the channel 38. An example of an elongated body is a protective conduit such as a conductor sheath 40 that protects the conductor(s). In one example, as shown in FIG. 3, the channel 38 has a dovetail shape in which the width of the channel 38 gradually increases from the inner surface 18 toward the interior of the segment wall 20. Such a shape allows the conductor sheath 40 to be disposed in the channel 38, either by feeding the conductor sheath 40 through the channel 38, or by inserting or "snapping" the conductor sheath 40 laterally into the channel 38. The shape of the channel 38 prevents the conductor sheath 40 from moving laterally into the bore 22 by a mechanical locking action. In one embodiment, additional securing mechanisms such as adhesives or protective plates or coverings are not necessary.

In one embodiment, the conductor sheath 40 or other elongated body has a cross-sectional shape that facilitates retention of the conductor sheath 40 within the communications conduit 24. For example, the conductor sheath 40 has any shape that acts to prevent the conductor 40 from moving laterally into the bore 22. The shape may be of any desired form, such as a dovetail, circular, tapered, eccentric or other shape.

Figure 4:
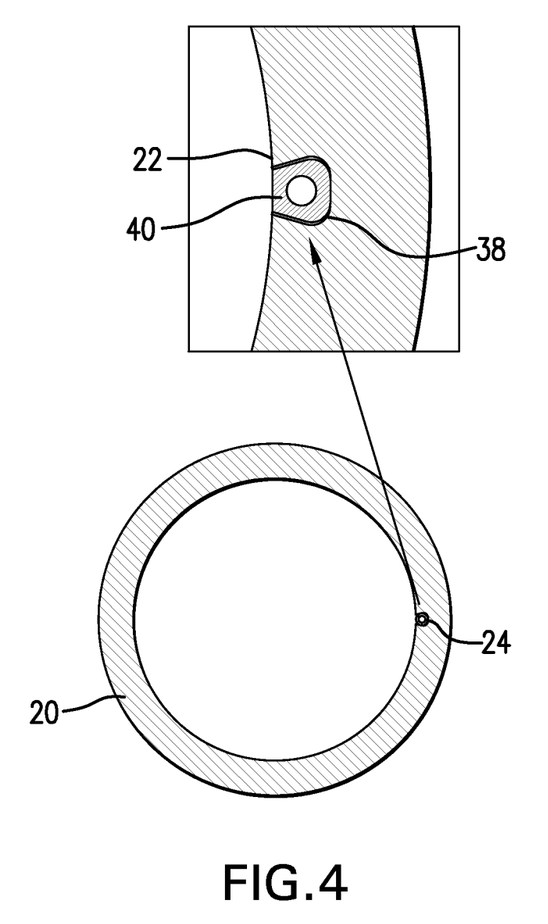
FIG. 4 is a cross-section of another exemplary embodiment of a borehole string component of FIG. 1.

Referring to FIG. 4, for example, the conductor 40 has a lateral shape that generally conforms to the shape of the communications conduit 24. In this example, the communications conduit is the dovetail channel 38, however the conductor 40 and the communications conduit 24 may have any shape suitable for securing the conductor 40 within the communications conduit 24.

Referring again to FIG. 1, in one embodiment, the segment 14 and/or the tool joint 34 includes at least one transmission device 42 disposed therein and located at the pin 26 and/or the box 28. The transmission device 42 is configured to provide communication between conductors 40 disposed in adjacent segments 14 and/or tool joints 34 when the pin 26 and the box 28 are engaged. The transmission device 42 may be of any suitable type, such as an inductive coil, direct electrical contacts and an optical connection ring. In one embodiment, the transmission device 42 is an inductive transmission ring disposed on or in a secondary shoulder 44 of the tool joint 34.

In one embodiment, the tool joint 34 includes an additional communications conduit 46 that extends along the length of the tool joint 34. The communications conduit is configured to align with the communications conduit 24 and/or the transmission device 42 of the segment 14 to affect operable communication between the communications conduits 24 and 46 when the segment 14 is coupled to the tool joint 34.

In one embodiment, the thread between the male portion 30 and the female portion 32 is a timed conical or cylindrical thread. Thread timing ensures that the communications conduit 24 is aligned with the communications conduit 24 in an adjacent segment 14 or with the tool joint communications conduit 46 after the connection is made. In another embodiment, the thread between the male portion 30 and the female portion 32 is an untimed thread.

In one embodiment, an additional shoulder ring 48 is included in the pin 24, the length of which may be adjusted, for example, by machining, to ensure that the communications conduit 24, 46 is aligned with an adjacent communications conduit 24, 46 after the connection is made. In one embodiment, the position of the communications conduit 24, 46 that needs to be hit can either be marked on the segment 14 and/or the tool joint 34 before the connection is made, or may be found by measurement such as ultrasonic measurement after the connection is made.

The segment 14, the pin 26, the box 28 and/or the tool joint 34 are made from any material, including a metal such as steel and aluminum. In one embodiment, the segment 14 is made from an extrudable material that is capable of withstanding conditions in a downhole environment such as aluminum, aluminum alloys and other extrudable metallic materials.

In one embodiment, the system 10 is operably connected to a downhole or surface processing unit which may act to control various components of the system 10, such as drilling, logging and production components or subs. Other components include machinery to raise or lower segments and to operably couple segments, and transmission devices. The downhole or surface processing unit may also collect and process data generated by the system 10 during drilling, production or other operations.

As described herein, "drillstring" or "string" refers to any structure or carrier suitable for lowering a tool through a borehole or connecting a drill bit to the surface, and is not limited to the structure and configuration described herein. For example, the string 12 is configured as a hydrocarbon production string or formation evaluation string. The term "carrier" as used herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, BHA's and drill strings.

Figure 5:
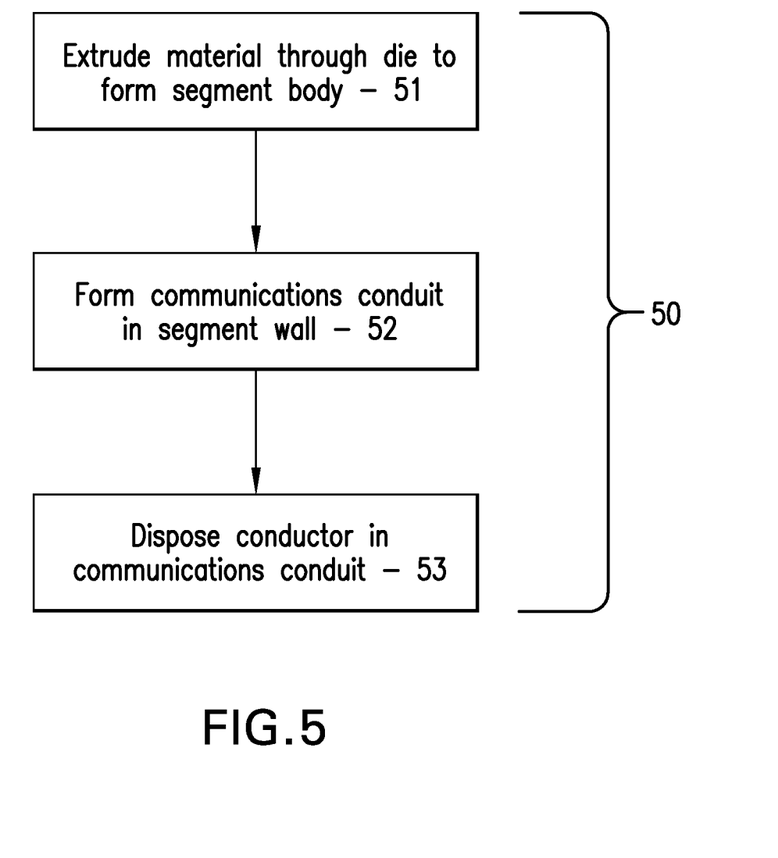
FIG. 5 depicts a flow chart providing an exemplary method of manufacturing a downhole conduit segment of a borehole conduit or string.

FIG. 5 illustrates a method 50 of manufacturing a downhole conduit segment of a borehole conduit or string such as a wired pipe. The method 50 includes one or more stages 51-53. In one embodiment, the method 50 includes the execution of all of stages 51-53 in the order described. However, certain stages may be omitted, stages may be added, or the order of the stages changed.

In the first stage 51, aluminum or other extrudable material is extruded through an extruding machine as a tubular shape to form the body of the segment 14. In one embodiment, the extruded shape is a cylindrical tube.

In the second stage 52, a communications conduit 24 is formed in the segment wall 20. In one embodiment, during the extrusion process, a communications conduit 24 is also extruded in the wall of the segment 14. In another embodiment, the communications conduit 24 is mechanically cut such as by drilling or machining, laser drilled, formed by electrodischarge machining (EDM) or otherwise formed after the segment 14 has been created.

In one embodiment, the communications conduit 24 is a hole 36 disposed between the outer surface 16 and the inner surface 18 and extending along the length of the segment 14. The hole 36 is completely enclosed by the segment wall 20. The hole may have a cylindrical shape, and may have any cross-sectional shape. Such cross sectional shapes include circular shapes, oval shapes, rectangular shapes and others.

In one embodiment, the communications conduit 24 is an elongated channel or groove, such as the channel 38, that extends along the length of the segment 14 and is exposed to the inner surface 18. The channel 38 may have any suitable shape, such as a semi-circular shape, a v-shape, a rectangular shape, a tapered shape and a dovetail shape. In one embodiment, the channel 38 has a cross-sectional shape that is configured to secure a conductor in place, i.e., to prevent the conductor from moving laterally into the inner bore 22.

Although the method described herein utilizes extrusion techniques, any other suitable technique may be utilized, such as casting.

In the third stage 53, a conductor 40 or other elongated body such as at least one wire, cable and/or conductor sheath 40 is disposed within the communications conduit 24. In one embodiment, the conductor sheath 40 is inserted or fed into the communications conduit from an end of the segment 14 and advanced through the communications conduit 24. In another embodiment, the conductor sheath 40 is snapped or otherwise fitted into the communications conduit from the inner bore 22.

Figure 6:
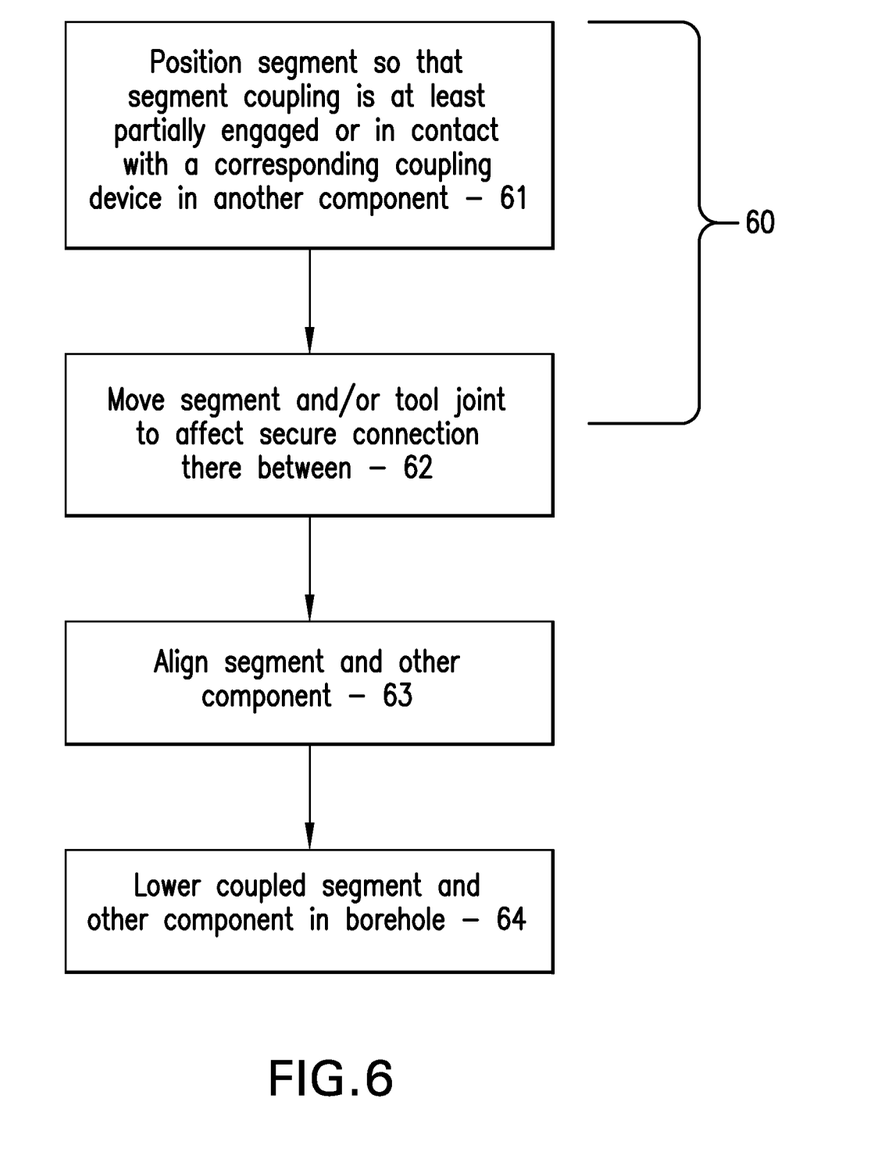
FIG. 6 depicts a flow chart providing an exemplary method of coupling segments of a downhole conduit.

FIG. 6 illustrates a method 60 of coupling segments of a downhole conduit. Such components include, for example, one or more segments 14 and one or more tool joints 34. The method 60 includes one or more stages 61-64. The method 60 is described herein in conjunction with the system 10, although the method 60 may be performed in conjunction with any number and configuration of rigs, processors or other machinery. In one embodiment, the method 60 includes the execution of all of stages 61-64 in the order described. However, certain stages may be omitted, stages may be added, or the order of the stages changed.

In the first stage 61, a segment 14 is disposed in a position such that a coupling device in the segment 14 is at least partially engaged or in contact with a corresponding coupling device in a tool joint 34, an adjacent segment 14 or other component. In one embodiment, the segment 14 and/or the tool joint 34 (or other component) are disposed within a borehole or at a surface location. In one embodiment, the coupling devices are pin box couplers such as the pin 26 and the pin box 28.

In the second stage 62, the segment 14 and/or the tool joint 34 or other component is rotated or otherwise moved to affect a secure connection between the segment 14 and the tool joint 34 or other component.

In the third stage 63, the segment 14 and the tool joint 34 or other component is aligned so that the segment communications conduit 24 is aligned with the tool joint communications conduit 46. In one embodiment, both the segment 14 and the tool joint 34 have pre-existing communications conduits. The segment 14 or the tool joint 34 is rotated until the communications conduits are in alignment. In one embodiment, the threads of the segment 14 and the tool joint 34 or other component are timed to ensure alignment.

An additional shoulder ring 48 or other alignment mechanism may be included in the pin 26 and/or the box 28 to facilitate alignment. In one embodiment, the position of either or both of the communications conduits 24, 46 is marked prior to the connection or is found by ultrasonic measurement after the connection is made.

In one embodiment, the tool joint 34 or other component does not have a communications conduit prior to connecting the segment 14 with the tool joint 34. In this embodiment, the segment 14 and the tool joint 34 are coupled via, for example, the pin 26 and the box 28, and a hole or other communications conduit 46 is drilled into the tool joint 34 in alignment with the segment communications conduit 24.

Optionally, the tool joint 34 or other component is shrink fit to the segment 14. The tool joint 34 may be shrink fit after the communications conduits are aligned, or may be shrink fit prior to drilling the communications conduit 46 in the tool joint 34.

In the fourth stage 64, the coupled segment 14 and the tool joint 34 (or other component) are lowered into a borehole. This lowering may be accomplished during a drilling operation or into an existing borehole during, for example, a logging, measurement and/or production operation.

The apparatuses and methods described herein provide various advantages over existing methods and devices, in that the segments or other tools include communications conduits that do not require additional mechanisms to secure a conductor or protect the conductor with the component. The conductor may be protected from corrosive attack and mechanical damage resulting from exposure to drilling fluid and other conditions in a borehole. In addition, the apparatuses and methods result in a drill pipe or other component inner diameter that is free of obstacles due to the conductor.

In addition, the use of extrudable materials such as aluminum materials is advantageous in the use of wired drill pipe. String components made from extrudable materials may be typically provided with larger wall thicknesses compared to steel drill pipe, and materials such as aluminum are much easier to machine than other materials such as high strength steel that are used in drill pipe manufacturing. Furthermore, communications conduits may be easily manufactured during the extrusion process, which results in easier and more efficient manufacture, and removes the need for other techniques such as deep gun drilling.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A downhole conduit segment comprising:
   a tubular body having an interior bore extending through a length of the segment, the body including an exterior surface and an interior surface defined by the interior bore, the body made from an extrudable material sufficient to withstand conditions in a downhole environment; and
   at least one extruded passageway formed in the tubular body and extending along the length of the body, the at least one extruded passageway partially enclosed within a segment wall formed between the exterior surface and the interior surface, the at least one extruded passageway having a cross-sectional dovetail shape configured to restrict lateral movement of a conductor disposed therein, the dovetail shape exposed to a surface of the segment wall and having a width that increases from the surface of the segment wall toward an interior of the segment wall, the at least one extruded passageway configured to hold the conductor laterally in place without any additional securing mechanisms.

2. The conduit segment of claim 1, wherein the tubular body is made from an aluminum material.

3. The conduit segment of claim 1, wherein the elongated channel is configured to allow the conductor to be snapped laterally in place without any additional securing mechanisms.

4. The conduit segment of claim 1, wherein the elongated channel is configured to allow the conductor to be disposed in the elongated channel by inserting the conductor laterally into the elongated channel.

5. The conduit segment of claim 1, wherein the conductor has a cross-sectional dovetail shape that conforms to the dovetail shape of the at least one extruded passageway.

6. The conduit segment of claim 1, further comprising a pin connector at a first end of the tubular body and a box connector at a second end of the tubular body.

7. The conduit segment of claim 1, further comprising a tool joint configured to operably connect the conduit segment to an additional conduit segment, the tool joint having a first end including a pin connector and a second end including a box connector.

8. The conduit segment of claim 7, wherein the conduit segment includes at least one first conductor disposed therein, and the tool joint includes a transmission device disposed in at least one of the pin connector and the box connector and configured to operably connect the first conductor to at least one additional conductor disposed in an additional conduit segment.

9. The conduit segment of claim 7, wherein the at least one extruded passageway is formed within the conduit segment and the additional conduit segment, and forms a continuous passageway when the conduit segment and the additional conduit segment are coupled via the tool joint.

* * * * *